(12) United States Patent
Moore

(10) Patent No.: US 10,580,335 B2
(45) Date of Patent: Mar. 3, 2020

(54) PORTABLE DISPLAY APPARATUSES

(71) Applicant: Toyota Motor Engineering & Manufacturing North America, Inc., Erlanger, KY (US)

(72) Inventor: Douglas A. Moore, Livermore, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 583 days.

(21) Appl. No.: 14/828,707

(22) Filed: Aug. 18, 2015

(65) Prior Publication Data
US 2017/0053572 A1    Feb. 23, 2017

(51) Int. Cl.
| | |
|---|---|
| *G09G 3/00* | (2006.01) |
| *G09F 15/00* | (2006.01) |
| *G09F 13/22* | (2006.01) |
| *G05B 15/02* | (2006.01) |
| *G09F 9/33* | (2006.01) |
| *G09F 21/06* | (2006.01) |
| *G09F 19/12* | (2006.01) |

(52) U.S. Cl.
CPC .......... *G09G 3/005* (2013.01); *G05B 15/02* (2013.01); *G09F 9/33* (2013.01); *G09F 13/22* (2013.01); *G09F 15/0068* (2013.01); *G09F 15/0075* (2013.01); *G09F 19/12* (2013.01); *G09F 21/06* (2013.01); *G09F 2013/222* (2013.01); *G09G 2380/06* (2013.01)

(58) Field of Classification Search
None
See application file for complete search history.

(56) References Cited

U.S. PATENT DOCUMENTS

| | | | |
|---|---|---|---|
| 6,739,725 B2 * | 5/2004 | Ben-Ari | G09F 19/18 244/30 |
| 6,773,110 B1 * | 8/2004 | Gale | F16M 13/04 348/211.4 |
| 7,099,701 B2 | 8/2006 | Lo et al. | |
| 7,123,211 B2 | 10/2006 | Nowatzyk | |
| 8,941,715 B1 | 1/2015 | McNelley et al. | |
| 8,947,495 B2 | 2/2015 | Sayeed et al. | |
| 2011/0149012 A1 * | 6/2011 | Bolle | H04N 7/144 348/14.08 |
| 2012/0056041 A1 * | 3/2012 | Rhee | B64C 25/32 244/4 R |
| 2012/0251072 A1 | 10/2012 | Cope et al. | |

(Continued)

*Primary Examiner* — Parul H Gupta
(74) *Attorney, Agent, or Firm* — Dinsmore & Shohl LLP

(57) ABSTRACT

Apparatuses for providing a portable display, such as temporary signage or telepresence communication capabilities, as well as methods for providing a portable display are described. A portable display apparatus includes a base, a collapsible component extending from the base and a plurality of light emitting devices coupled to the collapsible component. The collapsible component is configured to transition from a collapsed position to an extended position. The plurality of light emitting devices are arranged in a movable configuration such that, when the collapsible component is in the extended position, the plurality of light emitting devices rotate around the collapsible component and selectively illuminate to provide a display.

19 Claims, 12 Drawing Sheets

(56) References Cited

U.S. PATENT DOCUMENTS

| | | | |
|---|---|---|---|
| 2013/0233986 A1* | 9/2013 | Rasheta | G03B 17/561 248/205.1 |
| 2013/0271966 A1* | 10/2013 | Doble | A45B 3/04 362/183 |
| 2013/0300637 A1 | 11/2013 | Smits et al. | |
| 2014/0125770 A1 | 5/2014 | Bell et al. | |
| 2014/0277847 A1 | 9/2014 | Cann et al. | |

* cited by examiner

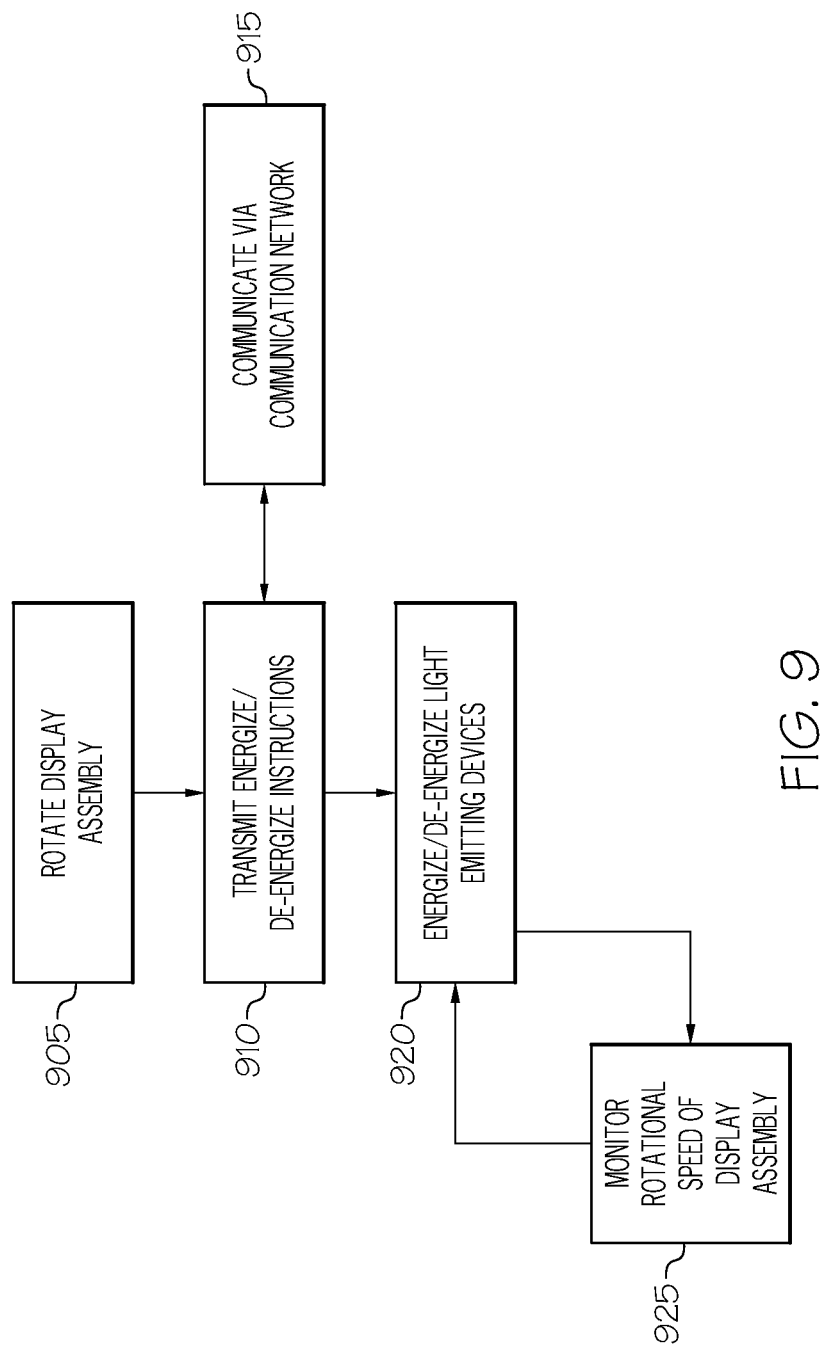

PORTABLE DISPLAY APPARATUSES

TECHNICAL FIELD

The present specification generally relates to displays and more specifically, to displays that can be remotely deployed and collapsed into a smaller size.

BACKGROUND

Portable display systems that are self propelled and can be remotely controlled have enjoyed widespread use over a variety of different applications. For example, certain portable display systems may be equipped with two-way communications so as to allow the portable display system to act as a telepresence device. In another example, some portable display systems can be deployed for temporary signage. However, one drawback to such systems is that they tend to be bulky and difficult to move and position, particularly in situations where quick repositioning would be preferable.

Accordingly, a need exists for a portable display system that is lightweight, contains fewer parts, and is collapsible such that it can be quickly moved from one location to another without significant hindrance.

SUMMARY

In one embodiment, a portable display apparatus includes a base, a collapsible component extending from the base and a plurality of light emitting devices coupled to the collapsible component. The collapsible component is configured to transition from a collapsed position to an extended position. The plurality of light emitting devices are arranged in a movable configuration such that, when the collapsible component is in the extended position, the plurality of light emitting devices rotate around the collapsible component and selectively illuminate to provide a display.

In yet another embodiment, a portable display apparatus includes a collapsible component, a display assembly coupled to the collapsible component, a processing device, and a non-transitory, processor readable storage medium. The non-transitory, processor readable storage medium includes one or more programming instructions that, when executed, cause the processing device to direct movement of the portable display apparatus to a particular location, extend the collapsible component from a collapsed position to an extended position, rotate the display assembly around the collapsible component, and receive incoming data from a remote device. The incoming data is translated into activation and deactivation signals that cause the display assembly to selectively illuminate to provide a display.

In another embodiment, a method of providing a portable display includes directing movement of a portable display assembly to a particular location. The portable display assembly includes a collapsible component and a display assembly coupled to the collapsible component. The method further includes extending the collapsible component from a collapsed position to an extended position, rotating the display assembly around the collapsible component, and receiving incoming data from a remote device. The incoming data is translated into activation and deactivation signals that cause the display assembly to selectively illuminate to provide a display.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 9 depicts a flow diagram of an illustrative method of illuminating a display assembly according to one or more embodiments shown and described herein;

DETAILED DESCRIPTION

The embodiments described herein are generally directed to a portable display apparatus that includes a movable base and a collapsible component containing a plurality of light emitting devices coupled thereto. The collapsible component may be collapsed such that the portable display apparatus can easily move between locations. In addition, the collapsible component can be extended once the portable display apparatus has moved to a particular location such that the plurality of light emitting devices can rotate around the collapsible component to display an image.

The apparatuses and methods described herein may be used, for example, as temporary signage or as a telepresence device. As used herein, a "telepresence device" refers to a device that is operated by a user that is located remotely from the telepresence device for the purposes of video and/or audio communication. The telepresence device can display a portion of the user's body, such as a head or the like, in order to simulate a user's physical presence at the location of the telepresence device. The telepresence device is mobile such that it can be operated by the user to move in any direction, such as to face certain individuals and/or objects, approach certain individuals and/or objects, move with individuals and/or objects, maintain a focus on a particular individual and/or objects, and/or the like. Accordingly, the telepresence device simulates the presence of the remote user. In some embodiments, the overall experience for the user and the participants interacting with the telepresence device may be similar to that of audio and/or videoconferencing, except that the remote user has a freedom of motion and control over the telepresence device.

Figure 1:
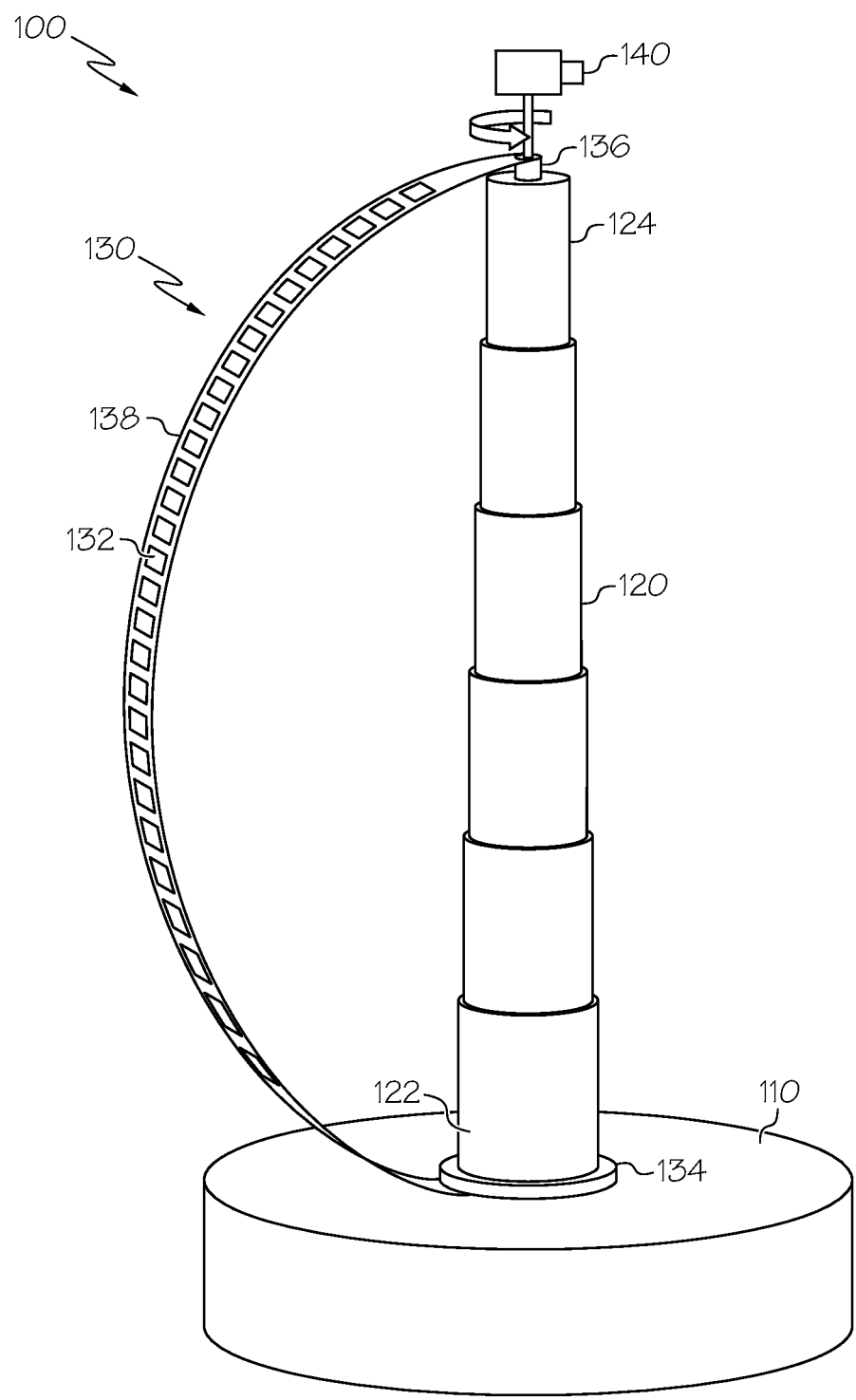
FIG. 1 depicts a perspective view of an illustrative portable display apparatus according to one or more embodiments shown and described herein.

FIG. 1 depicts an illustrative portable display apparatus, generally designated 100. The portable display apparatus 100 includes at least a base 110, a collapsible component 120, and a display assembly 130. In some embodiments, the portable display apparatus 100 may also include an imaging device 140. In some embodiments, the portable display apparatus 100 may also include one or more audio components (not shown), such as a speaker, a microphone, and/or the like such that the portable display apparatus 100 can project and/or receive sounds. The portable display apparatus 100 may generally be arranged such that a proximal portion 122 of the collapsible component 120 is coupled to the base 110 and a distal portion 124 of the collapsible component 120 extends from the base 110. While FIG. 1 depicts the collapsible component 120 as extending upwardly from the base 110, it should be understood that the collapsible component 120 may generally extend in any direction from the base 110. In some embodiments, the display assembly 130 may extend from at least one portion of the collapsible component 120, such as, for example, the distal portion 124 of the collapsible component 120, the proximal portion 122 of the collapsible component 120, or the base 110. The display assembly 130 may be rotatably mounted such that it can rotate around the collapsible component 120.

The base 110 may generally be a support structure that supports the various other components of the portable display apparatus 100, such as, for example, the collapsible component 120 and/or the display assembly 130. The shape and size of the base 110 are not limited by this disclosure, and may generally be any shape and/or size, particularly shapes and/or sizes suitable for supporting the various other components of the portable display apparatus 100. Thus, in some embodiments, the base 110 may be weighted to ensure the other components of the portable display apparatus 100 can be supported and/or to ensure an appropriate orientation of at least one of the other components of the portable display apparatus 100. The base 110 may be a single unit construction, or may be generally comprised of a plurality of separate base components joined together.

Figure 5:
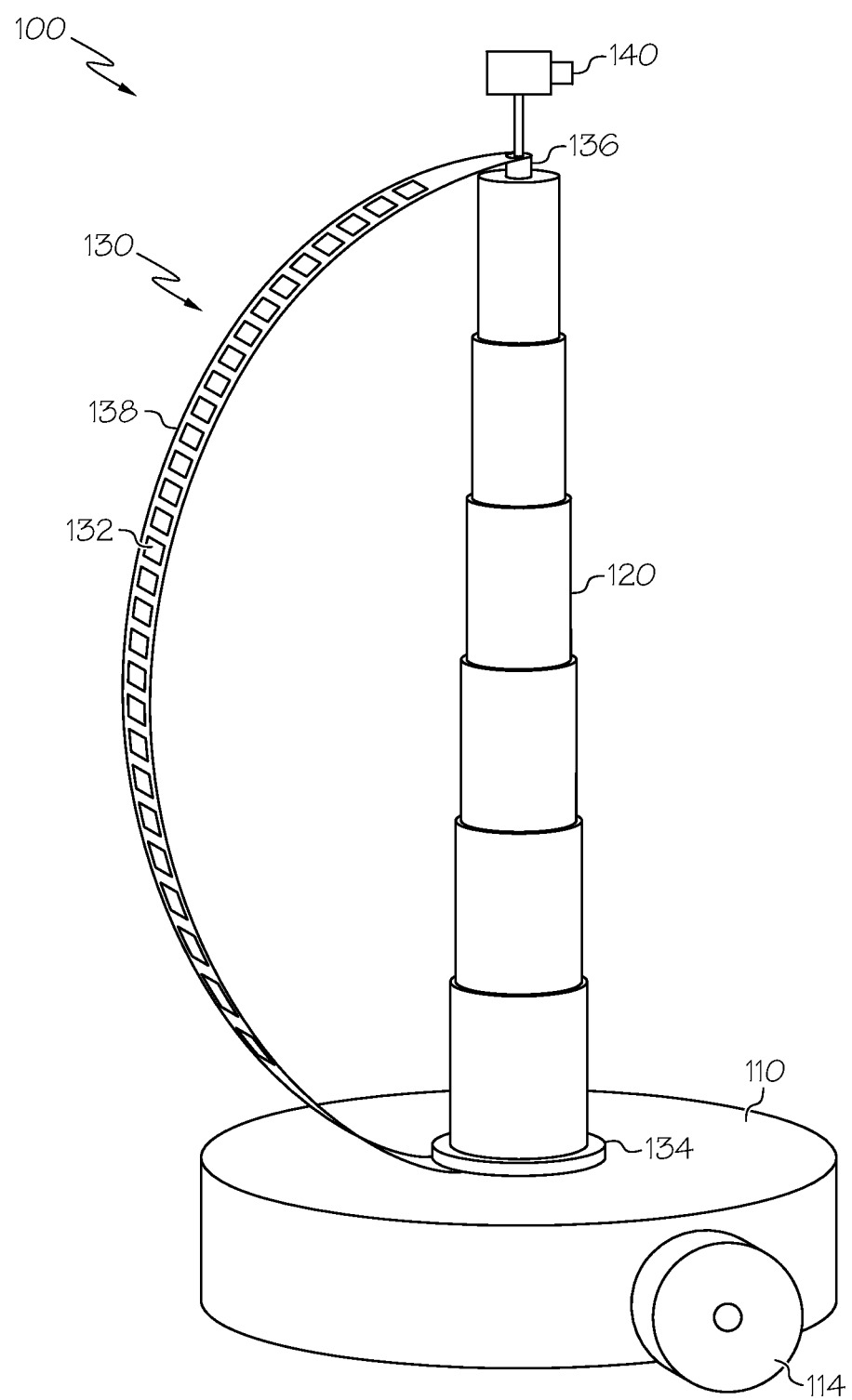
FIG. 5 depicts a perspective view of an illustrative portable display apparatus having a wheeled base according to one or more embodiments shown and described herein.
Figure 6:
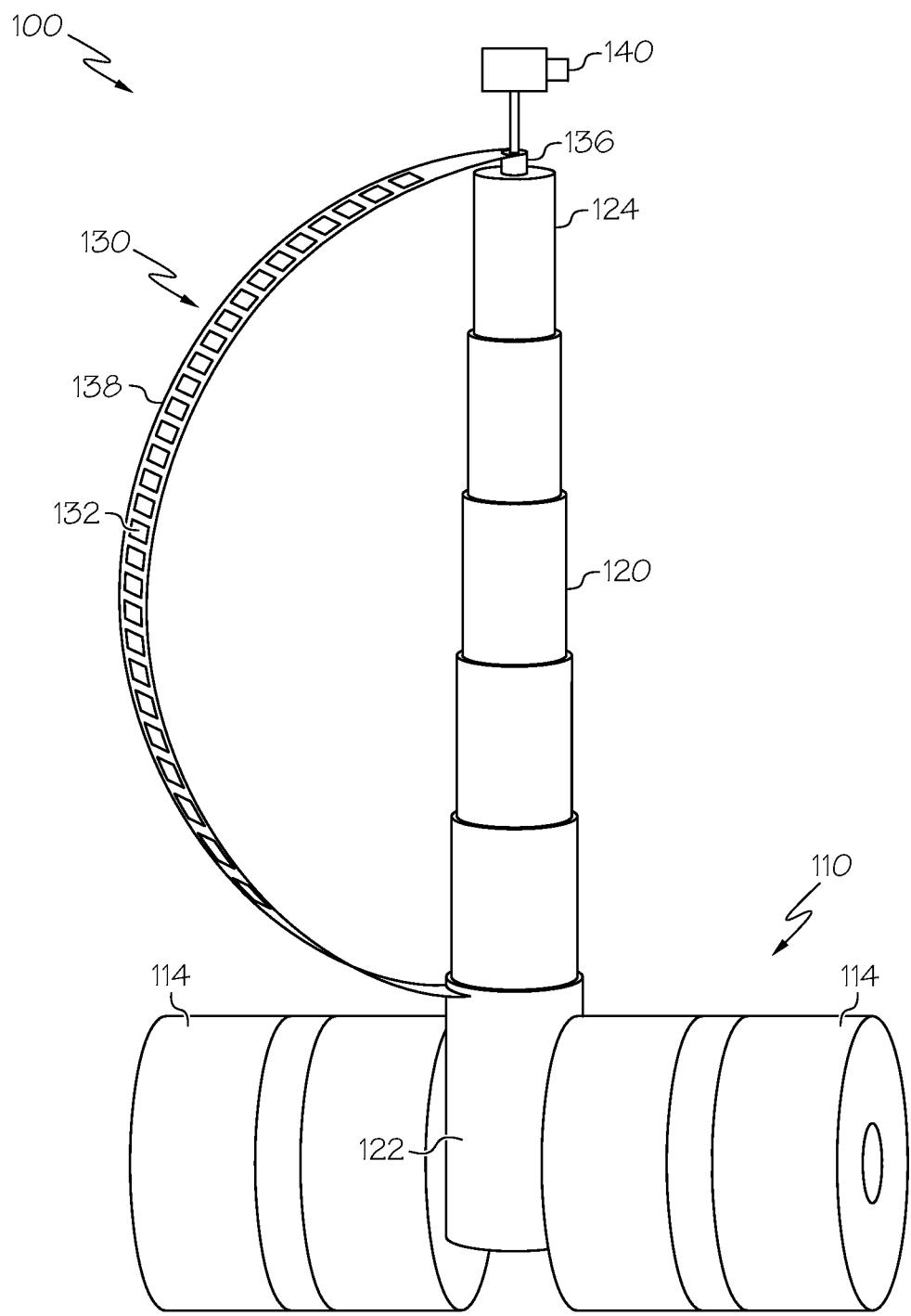
FIG. 6 depicts a perspective view of an illustrative portable display apparatus having a motorized balancing base according to one or more embodiments shown and described herein.

In addition, the base 110 may contain one or more components that provide the base 110 with an ability to move. Illustrative components include, but are not limited to, movable legs, wheels, flying components, and/or the like. For example, as shown in FIGS. 5 and 6, the base 110 may include one or more wheels 114. The number of wheels 114 on the base 110 is not limited by this disclosure and may generally include any number of wheels 114 necessary to allow the base 110 to freely move in any direction. Similarly, the size of the wheels 114 on the base 110 is not limited by this disclosure. For example, in some embodiments, certain wheels 114 may be large with respect to the base 110 to assist the base 110 in moving over rough terrain. In some embodiments, certain wheels 114 may be small with respect to the base 110 such that the base 110 can make very small and precise movements. In addition, the location of the wheels 114 on the base 110 is not limited by this disclosure. For example, the wheels 114 may be positioned at or near a side wall of the base 110, at or near a bottom of the base 110, integrated within a portion of the base 110, and/or the like. Some of the wheels 114 may be steerable, thereby allowing the base 110 to turn. In some embodiments, at least one of the wheels 114 may be integrated with a continuous track (caterpillar track).

As described in greater detail herein, the base 110 may contain one or more components that cause the wheels 114 to move in any direction. For example, in some embodiments, the base 110 may include movement-related components including, but not limited to, one or more of a motor, a drive mechanism, a force transfer mechanism, a gear, a steering device, and/or the like. As particularly shown in FIG. 6, various components of the base 110 may also provide a self-balancing capability to maintain an orientation of one or more of the other components of the portable display apparatus 100, such as, for example, the collapsible component 120. For example, the self-balancing capability may generally maintain a substantially vertical orientation of the collapsible component 120 when moving or when stationary. Such self-balancing components may include the movement-related components described above, as well as one or more gyroscopes, rotational sensors, and/or the like. It should be understood that other components to effect movement of the wheels 114, steer the base 110, and balance one or more components on the base 110 are included within the scope of the present disclosure.

Figure 7A:
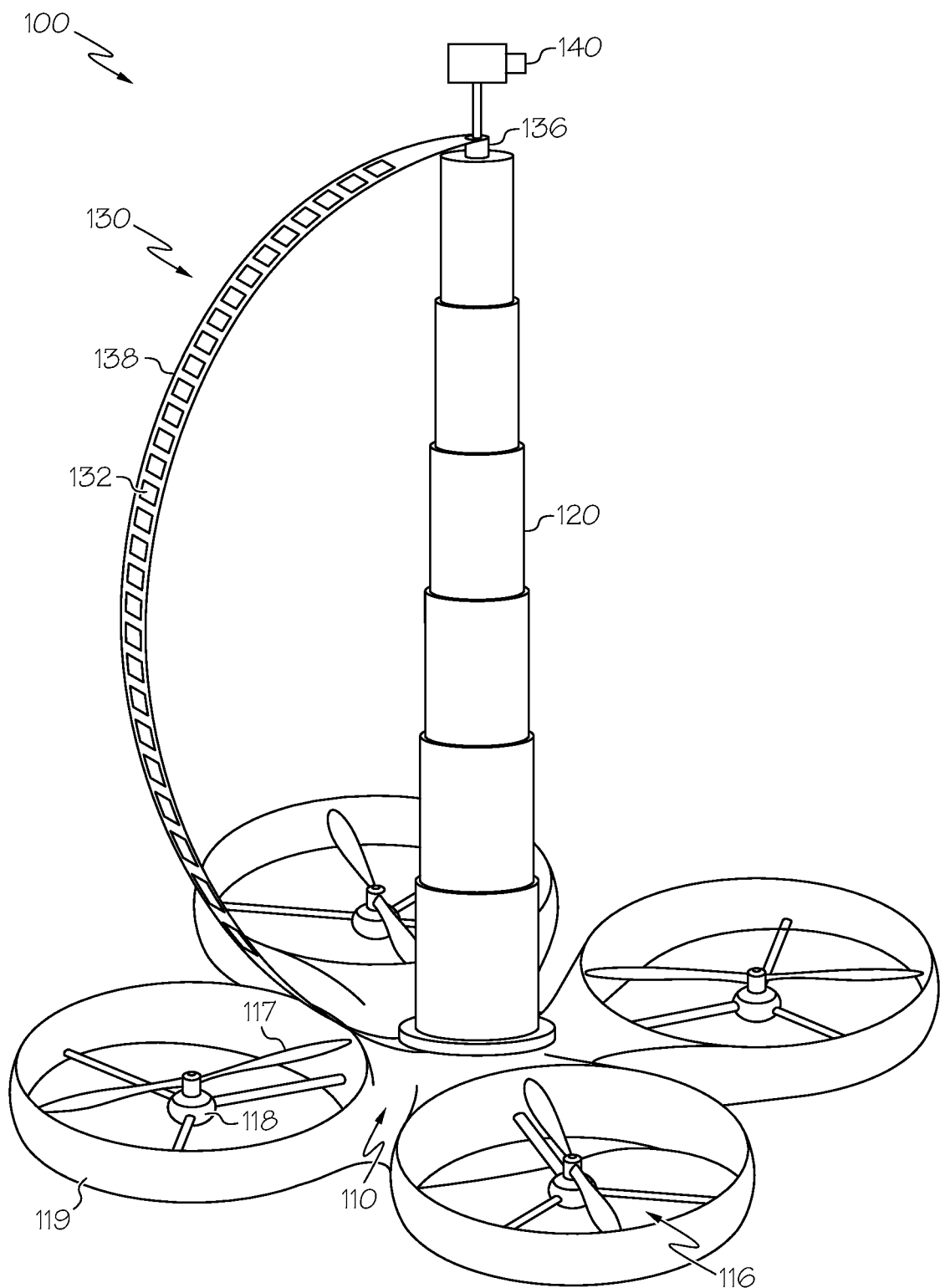
FIG. 7A depicts a perspective view of an illustrative portable display apparatus having a flying base according to one or more embodiments shown and described herein.
Figure 7B:
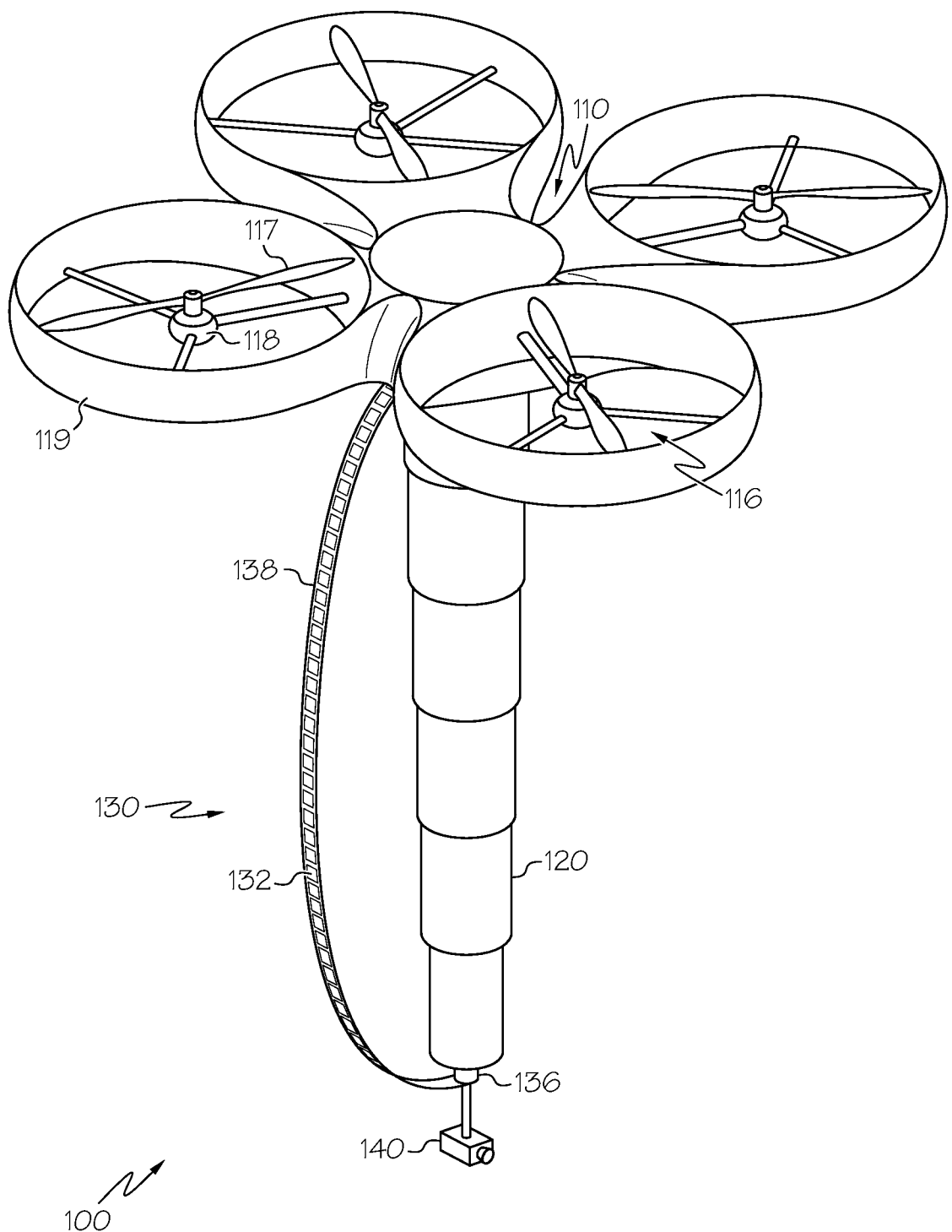
FIG. 7B depicts a perspective view of an illustrative portable display apparatus having an alternative flying base according to one or more embodiments shown and described herein.

In various embodiments, the base 110 may further include various flying components 116 in addition to, or as an alternative for, the wheels 114, as shown in FIGS. 7A and 7B. In a nonlimiting example, as shown in FIG. 7A, the collapsible component 120 may extend generally in an upward direction from a base 110 having various flying components 116. In another nonlimiting example, as shown in FIG. 7B, the collapsible component 120 may extend generally in a downward direction from a base 110 having various flying components 116.

Referring again to FIGS. 7A and 7B, the various flying components 116 are not limited by this disclosure and may generally include any component that allows the base 110 (and thus the portable display apparatus 100) to fly, hover in place, and/or the like. For example, in some embodiments, the base 110 may be attached to or integrated with a helicopter assembly. Such a helicopter assembly may include a frame 119, one or more motors 118, one or more electronic speed control devices, one or more propellers 117, and/or the like. The frame 119 may generally support the one or more motors 118, the one or more electronic speed control devices, the one or more propellers 117, and/or the like. In addition, the one or more motors 118 may drive rotational movement of the one or more propellers 117, which, when rotated, provide the necessary lift to cause the base 110 to fly in any direction, hover, and/or the like. In some embodiments, the helicopter may be quadcopter having 4 rotors. However, it should be understood that any rotorcraft, regardless of the number of rotors, may be used without departing from the scope of the present disclosure. Thus, the helicopter may include 1, 2, 3, 4, 5, 6, 7, 8, or more rotors. In addition, it should also be understood that the base 110 may be integrated with or attached to any unmanned aerial vehicle (UAV), drone, remotely piloted aircraft (RPA), or the like, as well as any component thereof, now known or later developed, without departing from the scope of the present disclosure. Thus, the base 110 may be piloted by a remote user or may move autonomously, as described in greater detail herein. In addition, by incorporating various flying components 116 with the base 110, the portable display apparatus 100 may traverse obstacles that would be impossible to traverse by similar wheeled devices, such as stairs and/or the like.

Figure 4A:
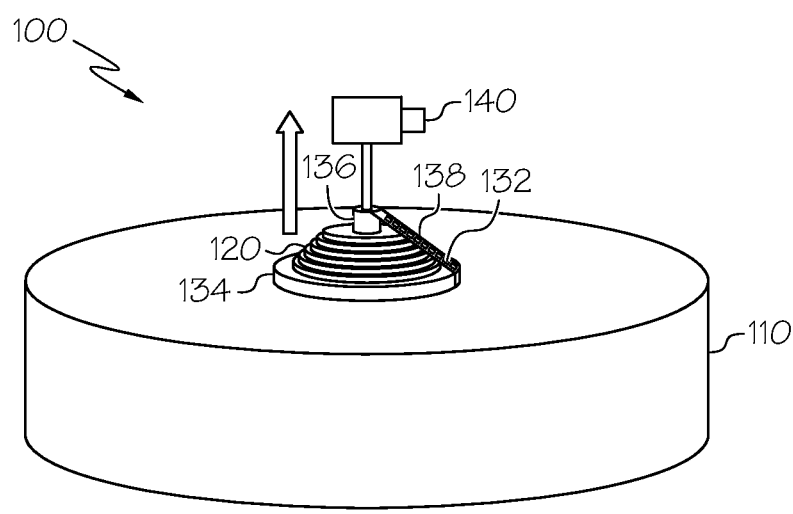
FIGS. 4A and 4B depict a perspective view of the portable display apparatus of FIG. 1 with a retracted collapsible component according to one or more embodiments shown and described herein.
Figure 4B:
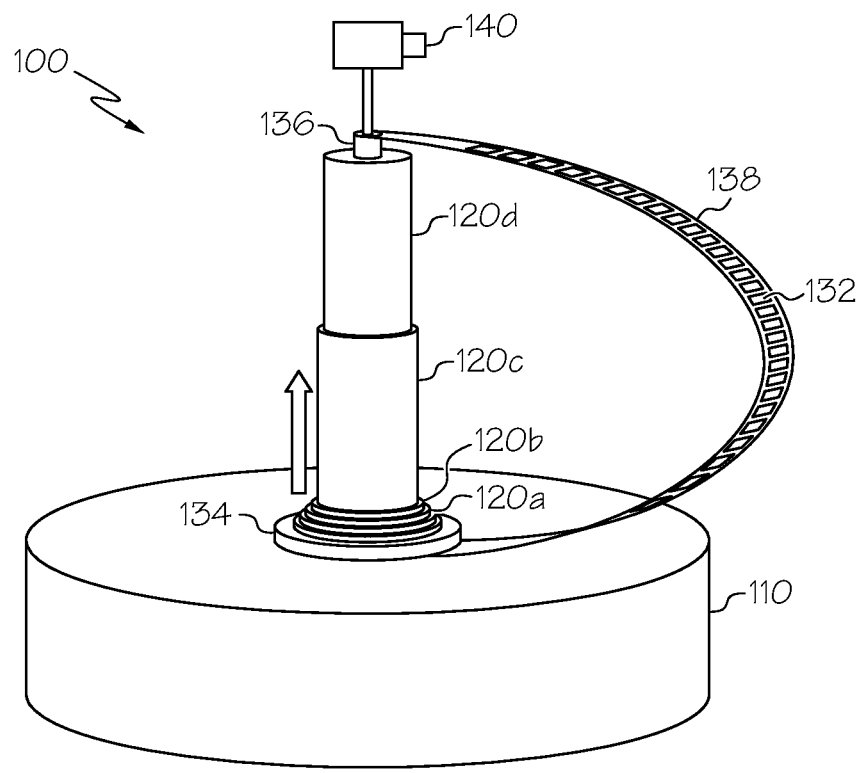
Figure 4C:
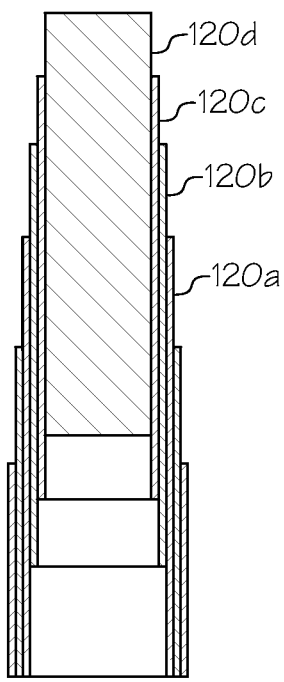
FIG. 4C depicts a cutaway view of a retracted collapsible component according to one or more embodiments shown and described herein.

Referring to FIGS. 4A-4C, the collapsible component 120 may generally be a component that collapses into itself and/or the base 110 such that the portable display apparatus 100 can easily move between locations without the various components such as the display assembly 130, the imaging device 140, and/or the like hindering movement in tight spaces, becoming damaged, and/or the like. That is, the ability to collapse the collapsible component 120 may provide maneuverability advantages over certain devices not containing such a collapsible component.

As particularly shown in FIG. 4C, the collapsible component 120 may be a telescoping pole that includes a plurality of segments, including, but not limited to, a first segment 120a, a second segment 120b, a third segment 120c, and a fourth segment 120d. The first segment 120a may have a cross-sectional size that is generally larger than that of the second segment 120b, which is generally larger than that of the third segment 120c, which is generally larger than that of the fourth segment 120d, and so on and so forth. Thus, the various segments of the collapsible component 120 may stack inside of each other in a nested configuration when the collapsible component 120 is in a collapsed or partially collapsed position, as shown in FIG. 4A. When the collapsible component 120 is extended (as indicated by the arrows in FIGS. 4A and 4B), the various segments 120a-d may move from the nested configuration to a fully extended configuration as shown in FIG. 1, for example. Movement between a nested configuration to a fully extended configuration may be manually completed by a user, may be electronically controlled by a user, or may be automatically controlled via one or more software programming modules. Electronic and automatic control of the collapsible component 120 may be completed by one or more of a linear component, a mechanical component, a hydraulic component, a pneumatic component, a piezoelectric component, and/or the like. The telescoping pole configuration of the collapsible component 120 is merely illustrative, and thus it should be understand that other configurations that allow the collapsible component 120 to collapse into itself and/or the base 110, such as foldable sections or the like, are included without departing from the scope of the present disclosure.

Figure 8A:
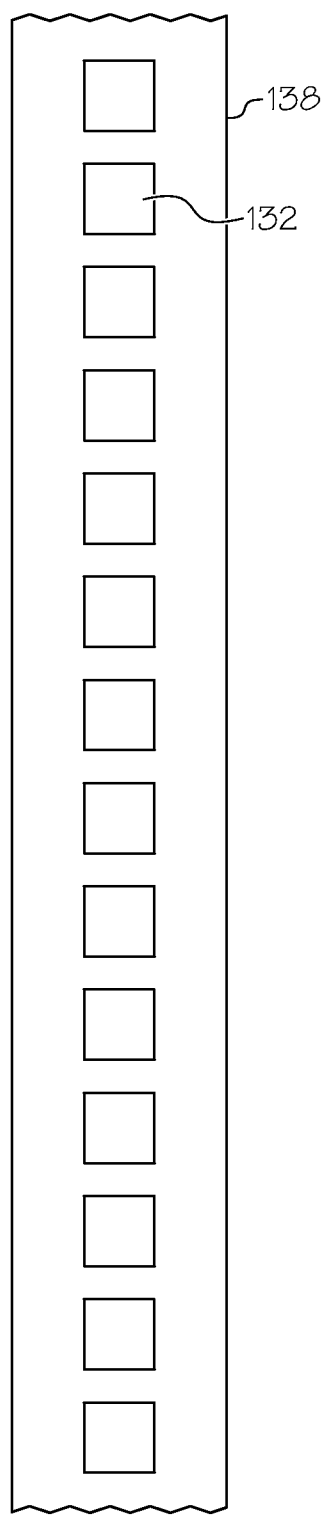
FIGS. 8A and 8B depict front and rear perspective views, respectively, of a plurality of illustrative light emitting devices coupled to a collapsible component of a portable display apparatus according to one or more embodiments shown and described herein.
Figure 8B:
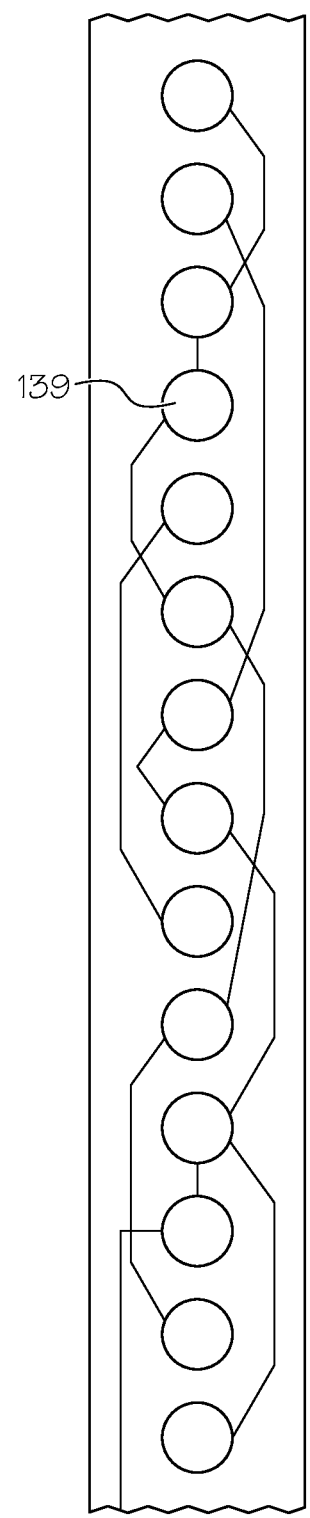

Referring again to FIG. 1, the display assembly 130 may generally include a plurality of light emitting devices 132. As shown in greater detail in FIGS. 8A and 8B, the plurality of light emitting devices 132 may be generally positioned on a substrate 138, such as, for example, a flexible printed circuit board (PCB), an electronic ribbon cable, and/or the like. The plurality of light emitting devices 132 may be arranged on the substrate 138 in any configuration, particularly certain configurations suitable to provide a display as described herein. As shown in FIG. 8A, in some embodiments, the plurality of light emitting devices 132 may be arranged in a column. While only a single column is depicted in FIG. 8A, it should be understood that the plurality of light emitting devices 132 may be arranged in a plurality of columns, such as in a grid arrangement or the like. In some embodiments, the plurality of light emitting devices 132 may be arranged on one surface of the substrate 138. In other embodiments, the plurality of light emitting devices 132 may be positioned on a plurality of surfaces of the substrate 138, such as, for example, a front surface and a back surface of the substrate 138.

The plurality of light emitting devices 132 may be interconnected with each other and/or various other components described herein via electronic circuitry 139. While only a single substrate 138 is depicted herein, it should be understood that a plurality of substrates 138 may be used without departing from the scope of the present disclosure. In a nonlimiting example, the display assembly 130 may comprise four substrates 138 having light emitting devices on them, wherein each of the substrates 138 are equally spaced around the collapsible component 120.

In the embodiments described herein, the plurality of light emitting devices 132 may include at least one device that outputs at least one beam of electromagnetic radiation. The at least one beam of electromagnetic radiation can be a beam having any wavelength of light. In some embodiments, the beam may have a wavelength within the spectrum of visible light. That is, each of the plurality of light emitting devices 132 may emit electromagnetic radiation at a wavelength that is generally visible to the unaided human eye, such as electromagnetic radiation that has a wavelength of about 390 nanometers (nm) to about 700 nm, including about 390 nm, about 400 nm, about 450 nm, about 500 nm, about 550 nm, about 600 nm, about 650 nm, about 700 nm, or any value or range between any two of these values (including endpoints). In some embodiments, each of the plurality of light emitting devices 132 may emit electromagnetic radiation that has a wavelength of about 450 nm to about 495 nm, about 495 nm to about 570 nm, or about 620 nm to about 750 nm.

Each of the plurality of light emitting devices 132 may generally be any light emitting device that can be selectively activated (turned on) and deactivated (turned off) independently of each other. Certain embodiments may include a plurality of light emitting devices 132 that can be quickly activated or deactivated. That is, each of the plurality of light emitting devices 132 may be pulsed by activating and deactivating the light emitting device at a pulse frequency, particularly a pulse frequency that is sufficient to provide a display, such as a frequency providing pulses of light that are shorter in duration than the integration time of an average naked eye. For example, each of the plurality of light emitting devices 132 may have a pulse frequency of about 10 Hz to about 500 kHz, including about 10 Hz, about 50 Hz, about 100 Hz, about 500 Hz, about 1 kHz, about 2 kHz, about 3 kHz, about 4 kHz, about 5 kHz, about 10 kHz, about 50 kHz, about 100 kHz, about 200 kHz, about 300 kHz, about 400 kHz, about 500 kHz, or any value or range between any two of these values (including endpoints). Control of activation and deactivation of each of the plurality of light emitting devices 132 may be completed by a control device 1020 (FIG. 10), as described in greater detail herein.

In some embodiments, each of the plurality of light emitting devices 132 may be a light emitting device having a gain medium that can be pumped electrically or optically to produce a desired output beam of light. Illustrative gain media may include, but are not limited to, Nd:YAG (neodymium-doped yttrium aluminum garnet), Yb:YAG (ytterbium-doped yttrium aluminum garnet), Yb:glass (ytterbium-doped glass), Er:YAG (erbium-doped yttrium aluminum garnet), and/or the like. Illustrative light emitting devices include, but are not limited to, a light emitting diode (LED), an organic light emitting diode (OLED), an active matrix-type organic light emitting diode (OLED), a liquid crystal display (LCD), a plasma display panel (PDP), a laser device, and/or the like. In some embodiments, the each of the plurality of light emitting devices 132 may be an RGB laser device, such as, for example, an RGB semiconductor laser. Such a device may output a beam of light at any color by combining individual light streams, each emitted from a different laser diode, to produce an output beam having a desired wavelength of visible light. For example, the device may include 3 laser diodes: a red laser diode that emits light at about 620 nm to about 750 nm, a green laser diode that emits light at about 495 nm to about 570 nm, and a blue laser diode that emits light at about 450 nm to about 495 nm. Various combinations of the light beams emitted from the three diodes generates a light beam having a desired color, which beam is subsequently emitted by the light source. The color of the light that is outputted may be controlled, for example, by a display controller, as described in greater detail herein. Thus, the display controller may independently operate each of the diodes in the RGB laser to output visible light at any one of a plurality of wavelengths. Moreover, the display controller may change the wavelength of the outputted visible light at any time, thereby allowing the display controller to direct each of the plurality of light emitting devices 132 to output a first pulse in a first color, a second pulse in a second color, and so on. Accordingly, it should be understood that when each of the plurality of light emitting devices 132 is an RGB laser device, a single light emitting device may be used to output different wavelengths of light.

In some other embodiments, each of the plurality of light emitting devices 132 may be a single wavelength laser device which outputs a beam of light at a single wavelength. In a nonlimiting example, the single wavelength laser device may be a laser diode that outputs the beam at any wavelength. In a particular example, the single wavelength laser device may be a laser diode that outputs the beam at a wavelength in the visible spectrum. That is, the single wavelength laser device may output light at a particular wavelength from about 380 nm to about 750 nm, including about 380 nm, about 400 nm, about 450 nm, about 500 nm, about 550 nm, about 600 nm, about 650 nm, about 700 nm, about 750 nm, or any value or range between any two of these values (including endpoints). In some embodiments, the single wavelength laser device may output the beam at a particular wavelength of from about 380 nm to about 450 nm, from about 450 nm to about 495 nm, from about 495 nm to about 570 nm, from about 570 nm to about 590 nm, from about 590 nm to about 620 nm, or from about 620 nm to about 750 nm, or any value or range between any of these values (including endpoints).

In some embodiments, each of the plurality of light emitting devices 132 may be a semiconductor laser device. As used herein, the phrase "semiconductor laser device" means any laser device having a semiconductor gain medium that can be pumped electrically or optically to produce a desired output beam of light. Illustrative gain media include, but are not limited to, GaAs (gallium arsenide), AlGaAs (aluminum gallium arsenide), GaP (gallium phosphide), InGaP (indium gallium phosphide), GaN (gallium nitride), InGaAs (indium gallium arsenide), GaInNAs (indium gallium arsenide nitride), InP (indium phosphide), GaInP (gallium indium phosphide), and/or the like. Examples of semiconductor laser devices may include, but are not limited to, a Distributed Feedback (DFB) laser and a Distributed Bragg Reflector (DBR) laser. In some embodiments, use of a semiconductor laser device as light emitting device may be desirable, as semiconductor laser devices are generally known to be capable of pulsing a beam of light at a pulse frequency that is faster than what is generally discernible by the average human observer (i.e., an average human would not recognize that the beam is continuously turned on and off). Moreover, semiconductor laser devices are readily available and can be easily controlled to alter the various properties of the light emitted therefrom, such as via a display controller, as described in greater detail herein. However, it should be understood that other types of light sources are contemplated and possible.

Referring again to FIG. 1, in some embodiments, the display assembly 130 may also include one or more rotating members, such as a proximal rotating member 134 and/or a distal rotating member 136. The rotating members may be attached to one or more other portions of the portable display apparatus 100 and the substrate 138 containing the plurality of light emitting devices 132 thereon such that the plurality of light emitting devices 132 can move independently of the portable display apparatus. For example, the proximal rotating member 134 may be attached to the proximal portion 122 of the collapsible component 120 and/or to the base 110 (e.g., between the base 110 and the proximal portion 122 of the collapsible component 120). In another example, the distal rotating member 136 may be attached to the distal portion 124 of the collapsible component 120. In some embodiments, the one or more rotating members may be centrally located with respect to one or more components of the portable display apparatus 100, such as, for example, the base 110 and the collapsible component 120. In other embodiments, one or more of the rotating members may be non-centrally located. For example, as shown in FIG. 2, the proximal rotating member 134 may be located at or near an outer edge 112 of the base 110 (e.g., along a track located at or near the outer edge 112).

Figure 2:
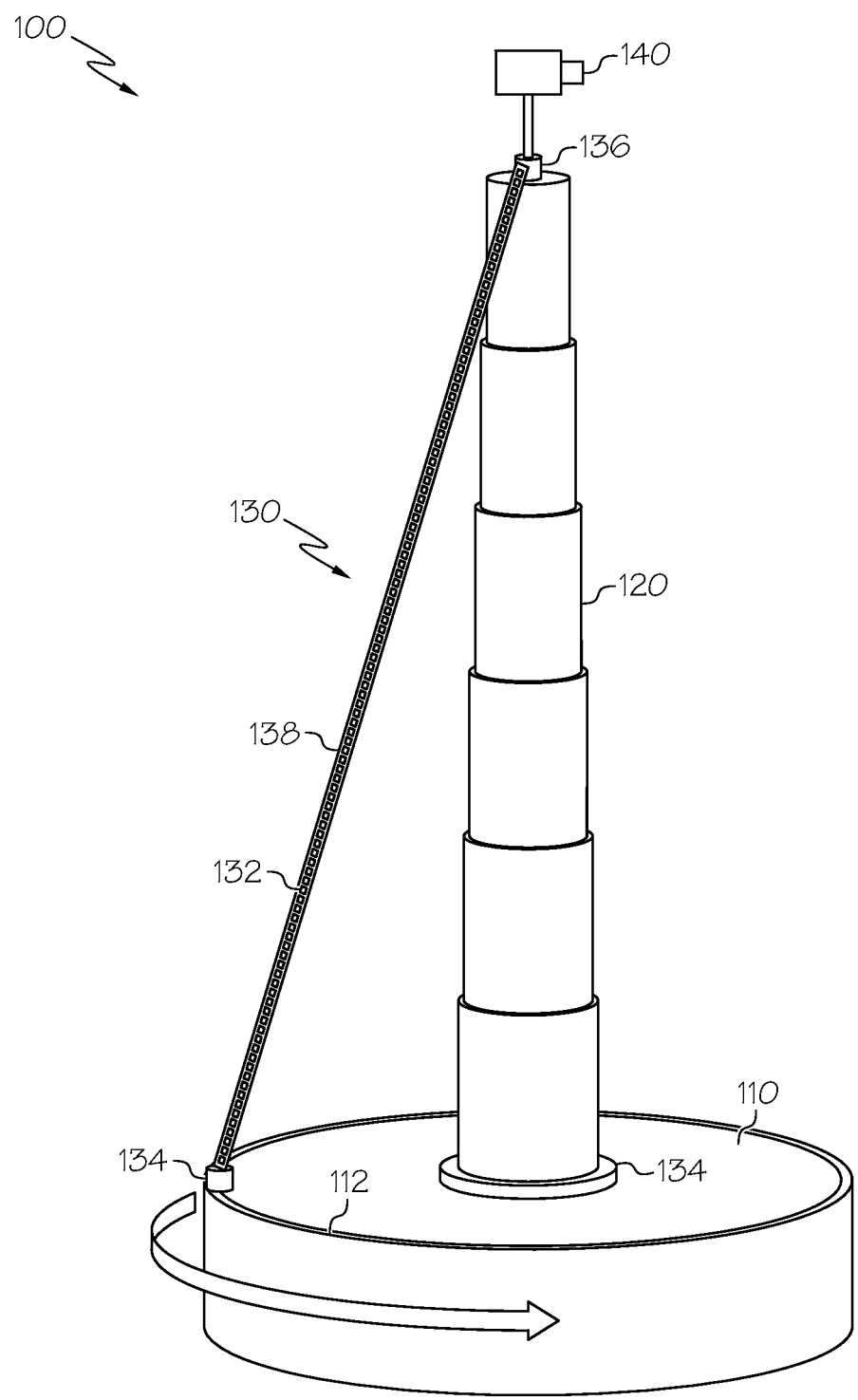
FIG. 2 depicts a perspective view of another illustrative portable display apparatus according to one or more embodiments shown and described herein.
Figure 3:
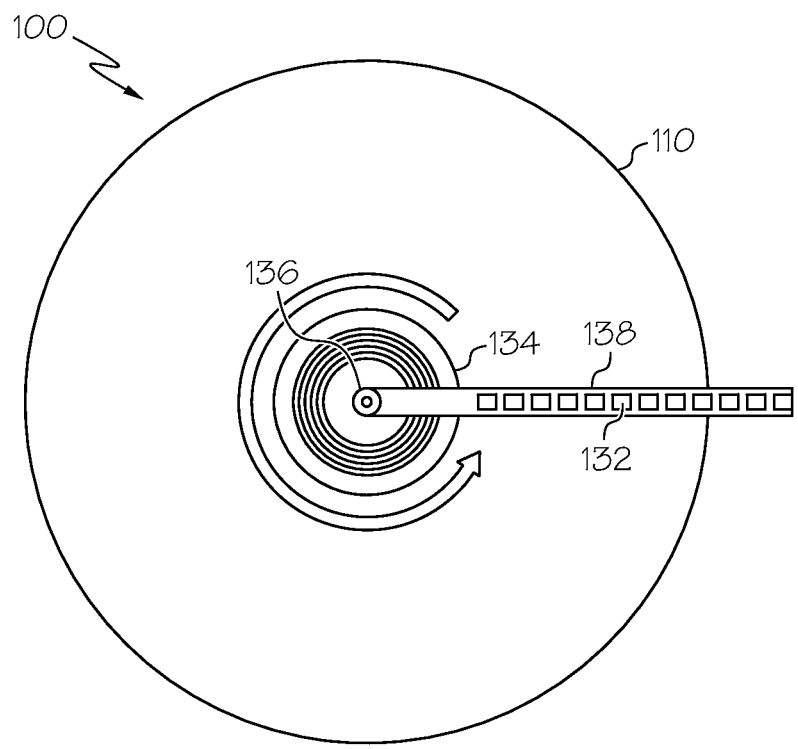
FIG. 3 depicts a top perspective view of the illustrative portable display apparatus of FIG. 1 according to one or more embodiments shown and described herein.

As shown in FIGS. 1-3, the display assembly 130 may rotate around the collapsible component 120, thereby causing the substrate 138 with the plurality of light emitting devices 132 to rotate. Rotation may generally occur at a rotational speed that is sufficient for a human observer, when viewing the rotating display assembly 130 at any angle, to view the displayed images. In some embodiments, the rotational speed may dependent on the size of the display assembly 130. In some embodiments, the rotational speed may be capped at a particular rate to avoid damage to the display assembly 130, avoid injuring a user, and/or the like. Illustrative rotational speeds may include any rotational speed that is sufficient to display the image to an average observer.

In some embodiments, the display assembly 130 may be encased in a protective cover or the like such that the display assembly 130 can rotate without being hindered or causing damage or injury. However, such a protective cover may be generally transparent or translucent such that the light emitting devices 132 are still visible to an observer. For example, the display assembly 130 may be located within a transparent globular shaped protective cover that allows a 360 degree view of the display assembly 130 therein.

Rotational movement of the display assembly 130 may generally allow for a full range viewing area. That is, the display assembly 130 may provide 360 degrees of viewing area to an observer adjacent to the portable display apparatus 100. Accordingly, any observer adjacent to the portable display apparatus 100, regardless of location, may be able to view the displayed video, images, and the like. In some embodiments, the display assembly 130 may selectively provide a viewing area that encompasses only a portion of the whole 360 degrees that is available. In a nonlimiting example, the display assembly 130 may provide a viewable portion that corresponds to a location of a particular observer adjacent to the portable display apparatus 100. In addition, the display assembly 130 may change the location of the viewable portion to ensure that it remains within view of the particular observer (e.g., when the observer moves relative to the portable display apparatus 100).

The display assembly 130 may generally be controlled such that the substrate 138 rotates and the light emitting devices selectively illuminate to provide an image. The image is not limited by this disclosure, and may include a still image and/or video. For example, when the portable display apparatus 100 is used as portable temporary signage, the display assembly 130 may be directed to display a still image or a moving image. In another example, when the portable display apparatus 100 is used for communication, such as use as a telepresence device, the display assembly 130 may be directed to display video, such as a live video stream of a remote user. In addition to video, the portable display apparatus 100 may also provide audio via a speaker or the like (not shown).

Control of the display assembly 130 is generally depicted in the flow diagram of FIG. 9. In step 905, the substrate 138 of the display assembly 130 (FIG. 1) is rotated. Rotation may be at a particular rotational speed, as described herein. In some embodiments, the rotational speed may be such that an average viewer, when viewing the spinning substrate 138 (FIG. 1) from any angle, sees a globular shaped object rather than a strip (or a plurality of strips) as depicted in FIG. 1.

In step 910, energize and de-energize instructions and/or signals are transmitted to each of the plurality of light emitting devices 132 (FIG. 1). The instructions and/or signals may generally provide a precise time and duration that each of the plurality of light emitting devices should be activated (illuminated) or deactivated (turned off). In addition, the instructions and/or signals may direct a particular color of light be transmitted by each of the light emitting devices at the precise time and duration. In some embodiments, the light emitting devices may remain activated, but may change the color of the light that is transmitted. In some embodiments, the instructions and/or signals may be based upon a communication signal received via a communication network, as shown in step 915. That is, the communications signal may be a transmission signal from a user device that is translated to activation and deactivation signals to display a live video feed from the user device.

As shown in step 920, the plurality of light emitting devices 132 (FIG. 1) may be energized or de-energized such that they activate or deactivate according to the instructions and/or signals that are received. In addition, as shown in step 925, the rotational speed of the display assembly may be monitored by a control device to ensure that the speed is sufficient to provide the display as described herein and so that it is synchronized with the activation and deactivation of the plurality of light emitting devices to provide an image that is visible to an average observer.

Referring to FIGS. 1-2, the imaging device 140 may be attached to any portion of the portable display apparatus 100, particularly at a location that allows the imaging device 140 to capture an image of an area surrounding the portable display apparatus 100. For example, the imaging device 140 may be mounted to the distal portion 124 of the collapsible component 120 such that the view of the imaging device 140 is not obstructed by the display assembly 130. In some embodiments, the imaging device 140 may be attached to a portion of the portable display apparatus 100 at a location that, when the collapsible component is extended, allows the imaging device 140 to be generally at or near eye level with a subject adjacent to the portable display apparatus 100.

The imaging device 140 is not limited by this disclosure, and may generally be any imaging device. Moreover, the present disclosure is not limited to a single imaging device 140. Rather, it should be understood that any number of imaging devices, either working independently or in tandem, may be used without departing from the scope of the present disclosure. The imaging device 140 may generally be any digital camera, including a digital still camera, a digital motion camera, or any combination thereof. Thus, the imaging device 140 may generally capture still or motion images and transmit the captured images, as described in greater detail herein. In addition, the imaging device 140 may also capture audio in conjunction with the images. Thus, it should be understood that the imaging device 140 may be a video camera, a web camera, and/or the like. The imaging device 140 may generally capture an image and/or sound of an area surrounding the portable display apparatus 100. That is, the field of view (FOV) of the imaging device 140 may generally contain any area generally adjacent to the portable display apparatus 100. In some embodiments, the FOV may be only a portion of the area generally adjacent to the portable display apparatus 100 (e.g., a 90° view or the like). In other embodiments, the FOV may encompass the entire area generally adjacent to the portable display apparatus 100 (e.g., a 360° view). In some embodiments, the imaging device 140 may be movable and/or adjustable to adjust the FOV as needed. Thus, the imaging device may pan, tilt, zoom, focus, and/or the like. In some embodiments, the imaging device 140 may be an auto tracking imaging device that contains software programming to automatically move and/or adjust to track movement of an object. Such auto tracking software programming may additionally function to control movement of other components of the portable display apparatus 100 to assist with movement of the imaging device 140, such as the various components of the base 110, as described herein.

Figure 10:
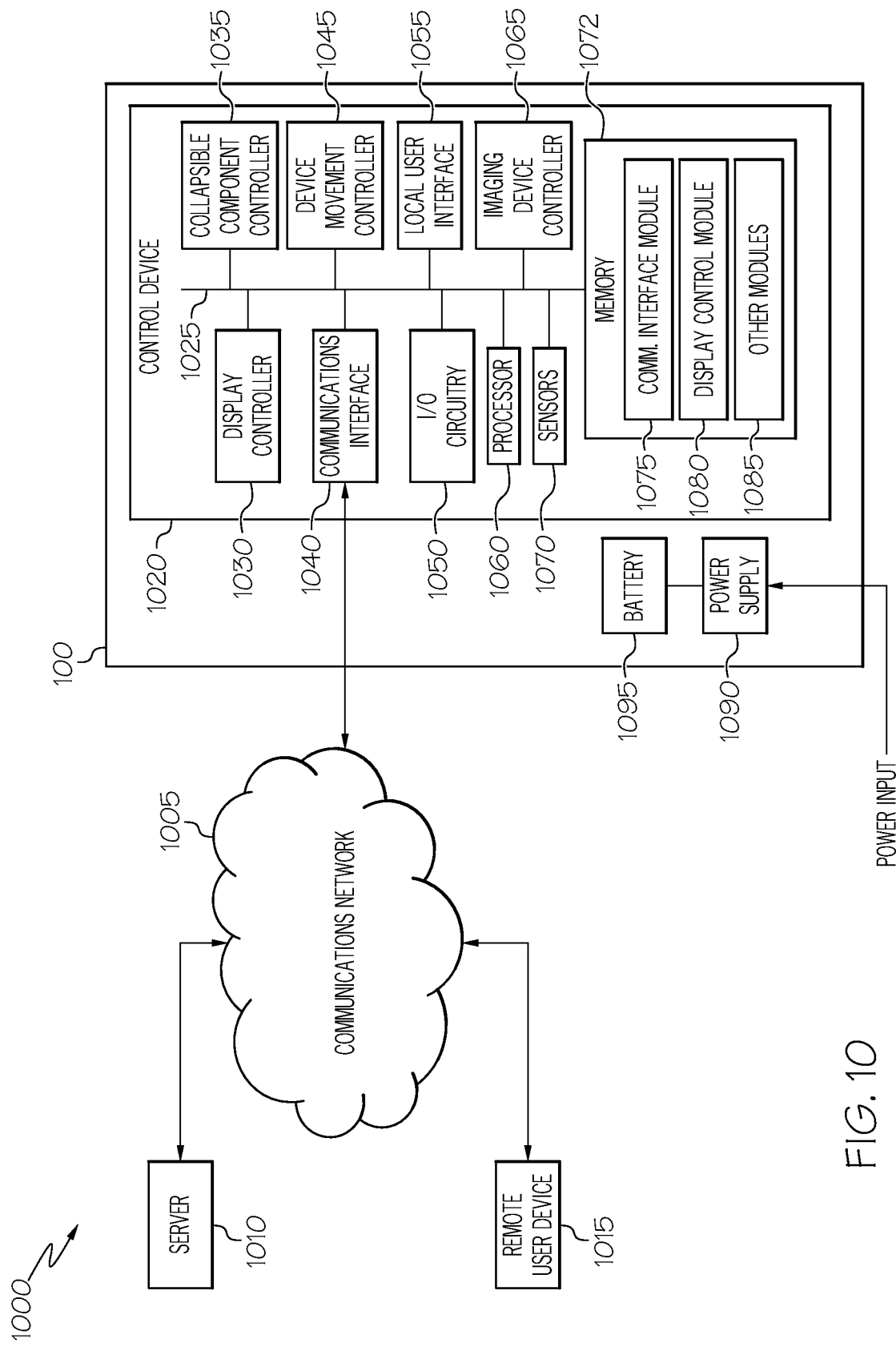
FIG. 10 depicts a schematic block diagram of various illustrative components of a portable display apparatus according to one or more embodiments shown and described herein.

In various embodiments, the portable display apparatus 100 may contain one or more internal components for controlling the portable display apparatus 100. For example, certain components may control communication between the portable display apparatus and a remote device, certain components may control movement of the portable display apparatus 100, certain components may control movement of various components of the portable display apparatus 100, and certain components may control interaction between the portable display apparatus 100 and a local user. Certain processes described herein for controlling the various components of the portable display apparatus 100 may generally be completed by a control device and/or a component thereof. An illustrative control device 1020, as well as hardware components thereof, is depicted in FIG. 10. A bus 1025 may interconnect the various components. A processing device 1060, such as a computer processing unit (CPU), may be the central processing unit of the control device 1020, performing calculations and logic operations required to execute a program. The processing device 1060, alone or in conjunction with one or more of the other elements disclosed in FIG. 10, is an illustrative processing device, computing device, processor, or combination thereof, as such terms are used within this disclosure.

Memory 1072, such as read only memory (ROM) and random access memory (RAM), may constitute illustrative memory devices (i.e., non-transitory processor-readable storage media). Such memory 1072 may include one or more programming instructions thereon that, when executed by the processing device 1060, cause the processing device 1060 to complete various processes, such as the processes described herein. The memory 1072 may optionally contain one or more modules therein, where each module contains one or more programming instructions to complete a particular task. Illustrative modules may include, but are not limited to, a communications interface module 1075, a display control module 1080, and/or one or more other modules 1085. Optionally, the program instructions may be stored on a tangible computer-readable medium such as a compact disc, a digital disk, flash memory, a memory card, a USB drive, an optical disc storage medium, such as a Blu-Ray™ disc, and/or other non-transitory processor-readable storage media.

An optional local user interface 1055 may permit information from the bus 1025 to be displayed on a display in audio, visual, graphic, or alphanumeric format. Moreover, the local user interface 1055 may also include one or more inputs that allow for transmission to and receipt of data from local input devices such as a keyboard, a mouse, a joystick, a touch screen, a remote control, a pointing device, a video input device, an audio input device, a haptic feedback device, and/or the like. In addition, the local user interface 1055 may include one or more sound related devices such as speakers, microphones, or the like to transmit sound to the local user and/or receive sound from the local user.

A communications interface 1040 may generally provide the control device 1020 with an ability to interface with one or more external components, such as, for example, a remote user device 1015 operated by a remote user and/or a server 1010. Communication with external components may occur using various communication ports (not shown). An illustrative communication port may be attached to a communications network 1005, such as the Internet, an intranet, a local network, a direct connection, and/or the like.

A display controller 1030 may generally provide signals and/or instructions to the display assembly 130 (FIG. 1) that direct the display assembly to provide a particular display. For example, the display controller 1030 may provide each of the plurality of light emitting devices 132 (FIG. 1) with an instruction to energize or de-energize at a particular moment such that each light emitting device 132 (FIG. 1) activates or deactivates, as described herein. In addition, the display controller 1030 may provide an instruction to one or more of the rotating members 134, 136 and/or a drive device controlling movement of one or more of the rotating members 134, 136 to rotate, stop rotating, increase a rotational speed, decrease a rotational speed, and/or the like.

A collapsible component controller 1035 may generally provide signals and/or instructions to the collapsible component 120 (FIG. 1) and/or one or more devices that control extension or retraction of the collapsible component 120. For example, the collapsible component controller 1035 may provide a signal directing the collapsible component 120 (FIG. 1) to collapse and/or may provide a signal directing the collapsible component 120 to extend.

A device movement controller 1045 may generally send and/or receive signals and/or instructions to or from one or more components of the portable display apparatus 100 to effect movement of the portable display apparatus 100. For example, the device movement controller 1045 may provide instructions to the base 110, the wheels 114, and/or the various flying components 116 (FIGS. 5-7). Particularly, the device movement controller 1045 may direct the portable display apparatus 100 to move in a particular direction, move at a particular speed, stop at a particular location, and/or the like. In some embodiments, the device movement controller 1045 may provide instructions and/or signals based on movement instructions received from a remote user at the remote user device 1015, instructions received from the server 1010, and/or based on sensed information received from an imaging device controller 1065, one or more sensors 1070, and/or the like. In some embodiments, the device movement controller 1045 may receive feedback signals from one or more components of the portable display apparatus 100. In a nonlimiting example, the wheels 114 (FIGS. 6-7) and/or one or more components connected thereto may provide certain feedback regarding traversed terrain, wheel malfunction, and/or other wheel-related issues.

The imaging device controller 1065 may send and/or receive signals and/or instructions to or from the imaging device 140 (FIG. 1). The various signals and/or instructions may, for example, direct movement of the imaging device 140, cause the imaging device to focus on a particular person or object, change the FOV, receive images and/or audio for transmission to the remote user device 1015, receive images and/or audio for transmission to the server 1010, and/or the like.

The control device 1020 may also include input/output circuitry 1050 that forms an interface between various components of the portable display apparatus, such as, for example, the collapsible component 120 (FIG. 1), the base 110 (FIG. 1), and/or various components thereof. The input/output circuitry 1050 may function in conjunction with any of the other components of the control device 1020, such as, for example, the display controller 1030, the collapsible component controller 1035, the device movement controller 1045, the imaging device controller 1065, and/or the like.

In some embodiments, the control device 1020 may include or be coupled to one or more sensors 1070. Such sensors 1070 may generally sense various environmental conditions adjacent to the portable display apparatus 100. For example, the sensors 1070 may sense obstructions or the like to assist the control device 1020 in determining a movement path of the portable display apparatus 100. In another example, the sensors 1070 may sense an orientation of the portable display apparatus 100, such as in embodiments where the portable display apparatus 100 contains a self-balancing base 110 (FIG. 6).

The portable display apparatus 100 may also include one or more power components to provide electrical power. For example, the portable display apparatus 100 may be plugged in to a standard wall outlet receive electrical power, may receive a fuel, may internally generate electricity, and/or the like. The power components may include, but are not limited to, a power supply 1090 and/or a battery 1095. It should be understood that various power components now known or later developed can be used in addition to, or as an alternative to, the components described herein to provide electrical power.

The remote user device 1015 may generally be a device that provides communications capabilities with the portable display apparatus 100. In nonlimiting examples, such communications capabilities may include directing the portable display apparatus 100 or to conduct a telepresence session. Illustrative examples of a suitable remote user device 1015 may include, but is not limited to, a computer such as a desktop computing system or a laptop computing system, a portable device such as a tablet or mobile telephone, and a dedicated telepresence system. The remote user device 1015 may be equipped with software modules configured to receive inputs from a remote user and transmit signals and/or instructions to the portable display apparatus 100. In addition, the remote user device 1015 may be equipped with an imaging device and/or sound components (e.g., speakers, microphones, etc.) to allow for a telepresence communication session.

The server 1010 may be a computing device containing storage media for storing information and/or data related to any of the devices or components described herein. In a nonlimiting example, the server 1010 may store data relating to a particular signage to be displayed on the portable display apparatus 100 or may store a data recording of a telepresence session.

Figure 11:
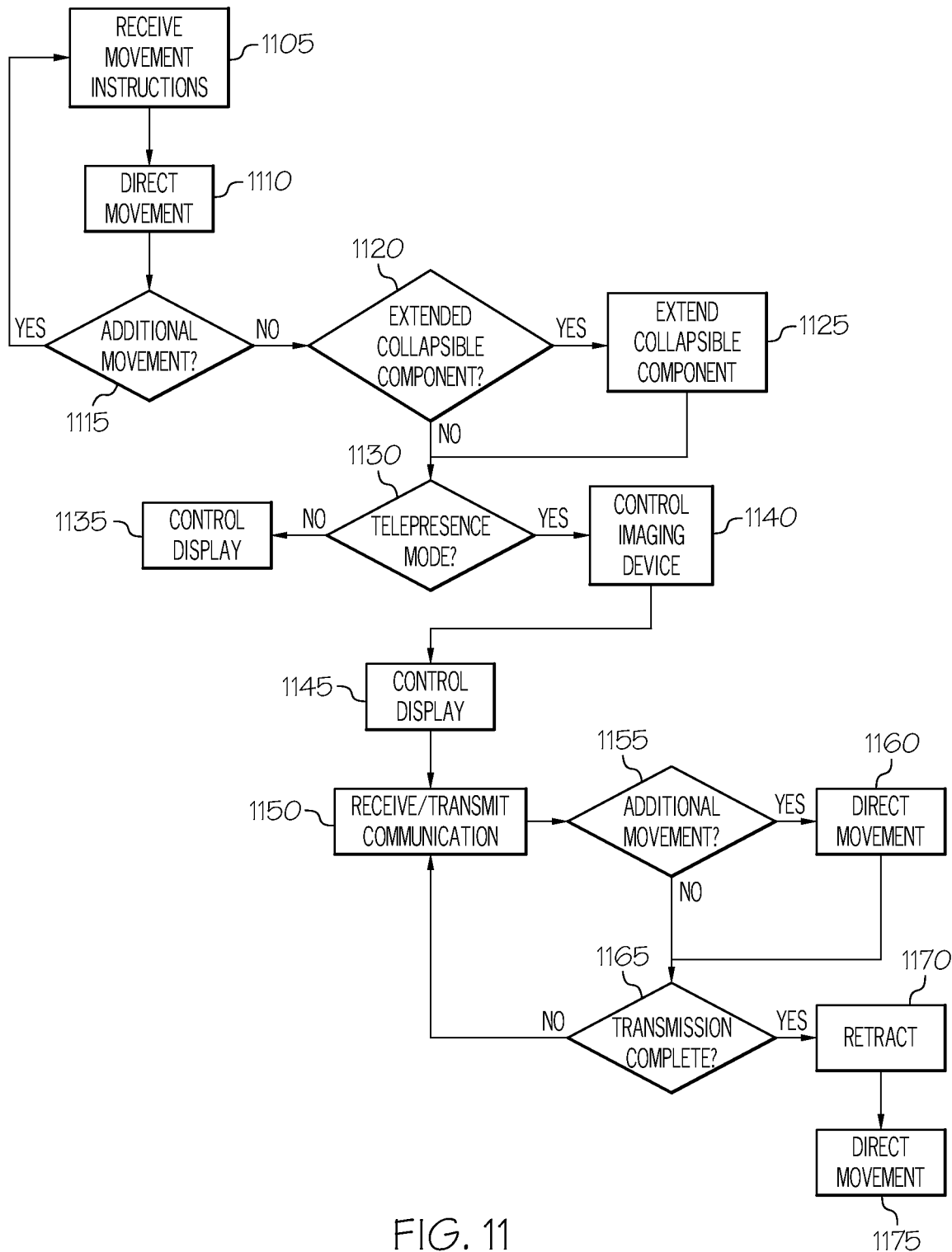
FIG. 11 depicts a flow diagram of an illustrative method of operating a portable display apparatus according to one or more embodiments shown and described herein.

Referring to FIG. 11, a method of providing a portable display and/or telepresence capabilities may generally be completed by one or more of the various components of the portable display apparatus 100 (FIG. 1) described herein. In some embodiments, the steps described with respect to FIG. 11 may be completed by the control device 1020 (FIG. 10). In other embodiments, the steps described with respect to FIG. 11 may be completed by one or more components other than the control device 1020 or such components in conjunction with the control device 1020 (FIG. 10).

In step 1105, movement instructions may be received. In some embodiments, the movement instructions may generally include instructions for the portable display apparatus to move to a particular location, follow a particular path, follow turn-by-turn commands, and/or the like. The instructions may be received by a user, from preprogrammed instructions stored in a non-transitory storage medium, in response to information received from one or more components of the portable display apparatus, and the like.

Movement may be directed in response to the instructions in step 1110. Directing movement may include, for example, providing a signal and/or instructions to one or more components of the portable display apparatus, as described in greater detail herein. In some embodiments, a single signal and/or instruction may be provided. In other embodiments, a plurality of signals and/or instructions may be provided. The instructions may be provided all at once, or may be continuously provided as the portable display apparatus moves to a particular location. In addition, modified signals and/or instructions may be provided in the event that the portable display apparatus makes an incorrect move, encounters an obstruction, and/or the like. In step 1115, a determination may be made as to whether additional movement is necessary. Additional movement may be necessary, for example, if the portable display apparatus has not reached a final destination or orientation. If additional movement is necessary, the process may return to step 1105. If no additional movement is needed, the process may proceed to step 1120. It should be understood, however, that movement of the portable display apparatus may be continuous. For example, the portable display apparatus may continuously move to track a particular person or object. Thus, the portable display apparatus may receive movement instructions at any time, even after proceeding to step 1120.

In step 1120, a determination may be made as to whether the collapsible component is to be extended. Such a determination may generally be based on whether the collapsible component is already extended. If the collapsible component is to be extended, it may be extended in step 1125. It may be extended, for example, by sending one or more signals and/or instructions to the collapsible component controller, the collapsible component itself, or any device or component that causes the collapsible component to extend from a collapsed configuration to an extended configuration.

In step 1130, a determination may be made is to whether the portable display apparatus is to be used in a telepresence mode. For example, in some embodiments, the portable display apparatus may be used solely as an electronic sign, such as, for example, to temporarily provide notifications and/or instructions to passerby. If the apparatus is not to be used in telepresence mode, only the display assembly may be controlled in step 1135. The display assembly may generally be controlled to illuminate based on received temporary signage data. If the portable display apparatus is to be used in telepresence mode, it may be prepared for telepresence communication by controlling both the imaging device and the display assembly, as shown in steps 1140 and 1145, respectively. Control of the display assembly may generally include sending one or more signals and/or instructions to the display assembly to selectively illuminate, as described in greater detail herein. Similarly, control of the imaging device may generally include using the imaging device to capture images, as well as sending and/or receiving one or more signals and/or instructions to or from the imaging device, as described in greater detail herein.

Once the portable display apparatus is prepared for telepresence communication, it may transmit and receive data in step 1150. Thus, the device may transmit video and/or audio signals to a remote user device and receive video and/or audio signals from a remote user device. The received data may be, for example, telepresence session data. It should be understood that the portable display apparatus may also transmit and receive data to and from a plurality of remote user devices, servers, and/or the like simultaneously. As described in greater detail herein, received data is translated into activation and deactivation signals that cause the display assembly to selectively illuminate to provide a display.

As previously described, in some embodiments, the portable user device may continuously move while transmitting and receiving communications, such as, for example, to track a moving object or user so that the imaging device maintains a visual focus on the moving object or user. Thus, in step 1155, a determination may be made as to whether additional movement is necessary, and if so, direct such movement in step 1160.

Communications may be continuously transmitted and received, and movement be directed, until the transmission is complete, as shown in step 1165. A complete transmission may be when no additional incoming data or outgoing data is to be transmitted. A determination of a complete transmission may include, but is not limited to, receiving a termination signal and/or identifying a terminated communication. For example, a user of the remote user device may click a button or the like to transmit a "terminate communication" signal or may deactivate a webcam to indicate a completed transmission. Once the transmission is complete, the display assembly may be stopped from rotating and the collapsible component may be retracted in step 1170 to the collapsed configuration such that the portable display apparatus can be moved, as shown in step 1175. For example, in some embodiments, the portable display apparatus may directed to move to a home location such as a docking station or the like.

Accordingly, the systems and apparatuses described herein can generally be used to provide a remote controlled temporary signage and/or telepresence communication. Such apparatuses and methods allow the portable display apparatus to move to a particular location without hindrance from larger, bulkier components that may be used in other devices. Moreover, the portable display apparatus can extend a collapsible component to provide a display or telepresence session.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A portable display apparatus comprising:
    a base;
    a telescoping collapsible component having a proximal portion coupled to the base and a distal portion that is extendible from the base, wherein the telescoping collapsible component is configured to transition from a collapsed position in which a plurality of component segments of the telescoping collapsible component are stacked in a nested configuration to an extended position; and
    a display assembly coupled to the distal portion of the telescoping collapsible component and to the base, wherein the display assembly is arranged in a movable configuration such that, when the telescoping collapsible component is in the extended position, the display assembly rotates around the telescoping collapsible component and selectively illuminates to display one or more images.

2. The portable display apparatus of claim 1, further comprising an imaging device coupled to the distal portion of the telescoping collapsible component, wherein the imaging device captures images of an area adjacent to the portable display apparatus.

3. The portable display apparatus of claim 1, wherein the base comprises at least one wheel that allows the portable display apparatus to move.

4. The portable display apparatus of claim 1, wherein the base comprises one or more flying components that allow the portable display apparatus to fly.

5. The portable display apparatus of claim 4, wherein the one or more flying components include a helicopter assembly.

6. The portable display apparatus of claim 4, wherein the one or more flying components comprise a frame supporting one or more motors and one or more propellers.

7. The portable display apparatus of claim 1, wherein the display assembly comprises at least one substrate having a plurality of light emitting devices thereon.

8. The portable display apparatus of claim 7, wherein the plurality of light emitting devices selectively activate and deactivate to selectively illuminate the display assembly and display the one or more images.

9. The portable display apparatus of claim 7, wherein the plurality of light emitting devices are arranged in at least one column on the at least one substrate.

10. The portable display apparatus of claim 7, wherein the at least one substrate is coupled to the base such that the at least one substrate extends from the distal portion of the collapsible component to the proximal portion of the telescoping collapsible component at an intersection of the proximal portion of the telescoping collapsible component and the base.

11. The portable display apparatus of claim 7, wherein the at least one substrate extends from the distal portion of the telescoping collapsible component to an outer edge of the base.

12. The portable display apparatus of claim 1, wherein the portable display apparatus provides telepresence capabilities for a remote user controlling the portable display apparatus.

13. A portable display apparatus comprising:
    a base;
    a telescoping collapsible component comprising a proximal portion coupled to the base and a distal portion that is extendible from the base such that a plurality of component segments of the telescoping collapsible component are stacked in a nested configuration when collapsed and are in a fully extended configuration when in an extended position;
    a display assembly coupled to the distal portion of the telescoping collapsible component and to the base;
    a processing device; and
    a non-transitory, processor readable storage medium, wherein the non-transitory, processor readable storage medium comprises one or more programming instructions that, when executed, cause the processing device to:
        direct movement of the portable display apparatus to a particular location,
        extend the telescoping collapsible component from a collapsed position to an extended position,
        rotate the display assembly around the telescoping collapsible component, and
        receive incoming data from a remote device, wherein the incoming data is translated into activation and deactivation signals that cause the display assembly to selectively illuminate to display one or more images.

14. The portable display apparatus of claim 13, wherein:
    the one or more images comprise at least one of still images and video, and
    a viewing area of the one or more images provides up to 360 degrees of viewable area surrounding the portable display apparatus.

15. The portable display apparatus of claim 13, further comprising an imaging device, and wherein the non-transitory, processor readable storage medium further comprises one or more programming instructions that, when executed, cause the processing device to direct the imaging device to capture images of an area adjacent to the portable display apparatus.

16. The portable display apparatus of claim 13, wherein the incoming data comprises temporary signage data or telepresence session data.

17. A method of providing a portable display, the method comprising:
    directing movement of a portable display device to a particular location, wherein the portable display device comprises:
        a telescoping collapsible component having a proximal portion coupled to a base and a distal portion that is extendible from the base, wherein the telescoping collapsible component is configured to transition from a collapsed position in which a plurality of component segments of the telescoping collapsible component are stacked in a nested configuration to an extended position, and a display assembly coupled to the distal portion of the telescoping collapsible component and to the base;

extending the telescoping collapsible component from the collapsed position to the extended position;

rotating the display assembly around the telescoping collapsible component; and receiving incoming data from a remote device, wherein the incoming data is translated into activation and deactivation signals that cause the display assembly to selectively illuminate to display one or more images.

18. The method of claim 17, further comprising:

capturing, via an imaging device, one or more captured images; and transmitting outgoing data to the remote device, wherein the outgoing data corresponds to the one or more captured images.

19. The method of claim 17, further comprising:

receiving a termination signal indicating no additional incoming data from the remote device;

stopping rotation of the display assembly; and retracting the telescoping collapsible component to the collapsed position.

* * * * *